United States Patent

Takeoka et al.

(10) Patent No.: US 9,318,262 B2
(45) Date of Patent: Apr. 19, 2016

(54) FILM CAPACITOR

(71) Applicant: PANASONIC CORPORATION, Osaka (JP)

(72) Inventors: Hiroki Takeoka, Nara (JP); Hidekazu Matsuoka, Toyama (JP); Hiroshi Kubota, Toyama (JP); Yasuhiro Hiraki, Hyogo (JP); Masahito Sano, Toyama (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 64 days.

(21) Appl. No.: 14/361,253

(22) PCT Filed: Dec. 19, 2012

(86) PCT No.: PCT/JP2012/008094
§ 371 (c)(1),
(2) Date: May 28, 2014

(87) PCT Pub. No.: WO2013/102977
PCT Pub. Date: Jul. 11, 2013

(65) Prior Publication Data
US 2014/0347780 A1 Nov. 27, 2014

(30) Foreign Application Priority Data
Jan. 6, 2012 (JP) .................. 2012-001015

(51) Int. Cl.
| | |
|---|---|
| H01G 2/16 | (2006.01) |
| H01G 4/015 | (2006.01) |
| H01G 4/18 | (2006.01) |
| H01G 4/32 | (2006.01) |
| H01G 4/012 | (2006.01) |
| H01G 4/228 | (2006.01) |
| H01G 4/30 | (2006.01) |

(52) U.S. Cl.
CPC ................. *H01G 2/16* (2013.01); *H01G 4/012* (2013.01); *H01G 4/015* (2013.01); *H01G 4/18* (2013.01); *H01G 4/228* (2013.01); *H01G 4/30* (2013.01); *H01G 4/32* (2013.01); *Y02T 10/7022* (2013.01)

(58) Field of Classification Search
CPC ........... H01G 2/16; H01G 4/18; H01G 4/015; H01G 4/012; H01G 4/32; H01G 4/30
See application file for complete search history.

(56) References Cited

U.S. PATENT DOCUMENTS

| | | | | |
|---|---|---|---|---|
| 7,697,261 B2* | 4/2010 | Okuno | ..................... | H01G 2/08 361/273 |
| 2008/0259522 A1* | 10/2008 | Okuno | ..................... | H01G 2/08 361/273 |
| 2011/0181998 A1* | 7/2011 | Yang | ....................... | H01G 2/16 361/275.4 |

FOREIGN PATENT DOCUMENTS

| | | |
|---|---|---|
| JP | 10-135072 A | 5/1998 |
| JP | 2004-087648 A | 3/2004 |

(Continued)

OTHER PUBLICATIONS

International Search Report issued in PCT/JP2012/008094, dated Mar. 26, 2013, with English translation.

*Primary Examiner* — David M Sinclair
(74) *Attorney, Agent, or Firm* — McDermott Will & Emery LLP

(57) ABSTRACT

A film capacitor includes a capacitor element and first and second external electrodes. The capacitor element includes a dielectric film, a first and a second electrode films facing each other across the dielectric film. The first electrode film includes electrode segments arranged in a matrix form, first fuses connecting the electrode segments adjacent to each other in a first direction, and second fuses connecting the electrode segments adjacent to each other in a second direction perpendicular to the first direction. The second fuses are arranged dispersedly in columns constituted by the electrode segments disposed in the second direction.

18 Claims, 9 Drawing Sheets

(56) References Cited

FOREIGN PATENT DOCUMENTS

| | | | |
|---|---|---|---|
| JP | 2005012082 A | * | 1/2005 |
| JP | 2007-053222 A | | 3/2007 |
| JP | 2007-053223 A | | 3/2007 |
| JP | 2008-235415 A | | 10/2008 |
| JP | 2008235414 A | * | 10/2008 |
| JP | 2009-088258 A | | 4/2009 |
| JP | 2009-259931 A | | 11/2009 |

* cited by examiner

FILM CAPACITOR

RELATED APPLICATIONS

This application is the U.S. National Phase under 35 U.S.C. §371 of International Application No. PCT/JP2012/008094, filed on Dec. 19, 2012, which in turn claims the benefit of Japanese Application No. 2012-001015, filed on Jan. 6, 2012, the disclosures of which Applications are incorporated by reference herein.

TECHNICAL FIELD

The present invention relates to a film capacitor to be used in a variety of electronic devices, electric apparatuses, industrial machines, and automobiles, more particularly, relates to a film capacitor suitable for a smoothing, filtering or snubbering in an inverter circuit that drives a motor of a hybrid vehicle.

BACKGROUND ART

In recent years almost all the electric apparatuses have been controlled by inverter circuits from the viewpoint of environmental protection, thereby pursuing energy saving and higher efficiency. The automotive industry, in particular, introduces a hybrid vehicle (HEV), which can be driven by an electric motor and an engine, into the market. In the automotive industry, techniques related to environment, energy saving, and higher efficiency have been actively developed.

The electric motor to be used in the HEV works in a high voltage range, such as several-hundred volts, so that a metalized film capacitor has drawn attention to be used in this electric motor since the metalized film capacitor has features of a high withstanding voltage and a low loss.

Metalized film capacitors are categorized into two types; one type employing a metal foil as an electrode; and the other type employing a metal film made by depositing metal on a dielectric film as an electrode. The metalized film capacitor employing the metal film made by depositing metal as the electrode has an advantage of a smaller volume occupied by the electrode over the other capacitor employing the metal foil. The metalized film capacitor can thus have a small size and a light weight. The metalized film capacitor also has a self-recovery function to an electrode film formed by depositing, namely, the electrode film around a defective area is vapored and scattered, thereby recovering the function of capacitor. This function is referred to as a self-healing property, and enhances reliability against dielectric breakdown. The metalized film capacitor is thus widely used. A thinner electrode film tends to vapor and scatter more easily, so that the self-healing property can be enhanced, having a higher withstanding voltage expected.

FIG. 7 is a perspective view of conventional film capacitor 1. Film capacitor 1 includes capacitor element 5 and a pair of external electrodes 6 formed on both ends of capacitor element 5. Capacitor element 5 includes a pair of metalized films 4 which are wound. Each metalized film 4 includes dielectric film 2 and electrode film 3 formed on dielectric film 2. The pair of metalized films 4 are wound such that electrode films 3 formed in the pair of metalized films 4 face each other across dielectric film 2, then the pair of metalized films 4 are wound. Electrode film 3 of at least one of the pair of metalized films 4 includes electrode segments 7, first fuses 8 connecting electrode segments 7 to each other, and second fuses 9 connecting electrode segments 7 to each other. Electrode segments 7 are arranged in plural columns in first direction 5A in which the pair of external electrodes 6 are arranged. Electrode segments 7 are also arranged in second direction 5B perpendicular to first direction 5A. First fuses 8 connect electrode segments 7 adjacent to each other along first direction 5A while second fuses 9 connect electrode segments 7 adjacent to each other along second direction 5B. When electrode segment 7 out of electrode segments 7 is short-circuited and have an over-current flowing thereto, fuses 8 and 9 connected to the short-circuited electrode segment 7 are fused, thereby isolating the shorted electrode segment 7. This operation allows film capacitor 1 have a high withstanding voltage while the capacitance of the capacitor decreases.

Related art to film capacitor 1 is disclosed in, for instance, Patent Literatures 1 and 2.

CITATION LIST

Patent Literature

Patent Literature 1: Japanese Patent Laid-Open Publication No. 10-135072
Patent Literature 2: Japanese Patent Laid-Open Publication No. 2004-87648

SUMMARY

A film capacitor includes a capacitor element and first and second external electrodes disposed on the capacitor element. The capacitor element includes a dielectric film, a first electrode film disposed on the dielectric film, and a second electrode film facing the first electrode film across the dielectric film. The capacitor element has a first end and a second end arranged in a first direction. The first external electrode is disposed on the first end of the capacitor element and connected to the first electrode film. The second external electrode is disposed on the second end of the capacitor element and connected to the second electrode film. The first electrode film includes plural electrode segments, plural first fuses connecting the plural electrode segments, and the plural second fuses connecting the plural electrode segments. The plural electrode segments are separated by first slits extending in the first direction and second slits extending in a second direction perpendicular to the first direction. The plural electrode segments are arranged in a matrix form including plural rows arranged in the first direction and plural columns arranged in the second direction. The first fuses are located at the plural second slits so as to connect electrode segments out of the plural electrode segments adjacent to each other in the first direction. The second fuses are located at the plural first slits so as to connect electrode segments out of the plurality of electrode segments adjacent to each other in the second direction. At least one of the second fuses is located at each of the first slits. The plural columns of the electrode segments include a farthest column farthest from the first external electrode among the plural columns of the electrode segments and one or more other columns other than the farthest column. In each of the one or more other columns, at least one electrode segment of two electrode segments out of the plural electrode segments adjacent to any one of the electrode segments in the second direction is electrically disconnected from the any one of the electrode segments in the second direction.

This metalized film capacitor has a high withstanding voltage stably.

DETAIL DESCRIPTION OF PREFERRED EMBODIMENT

Figure 1:
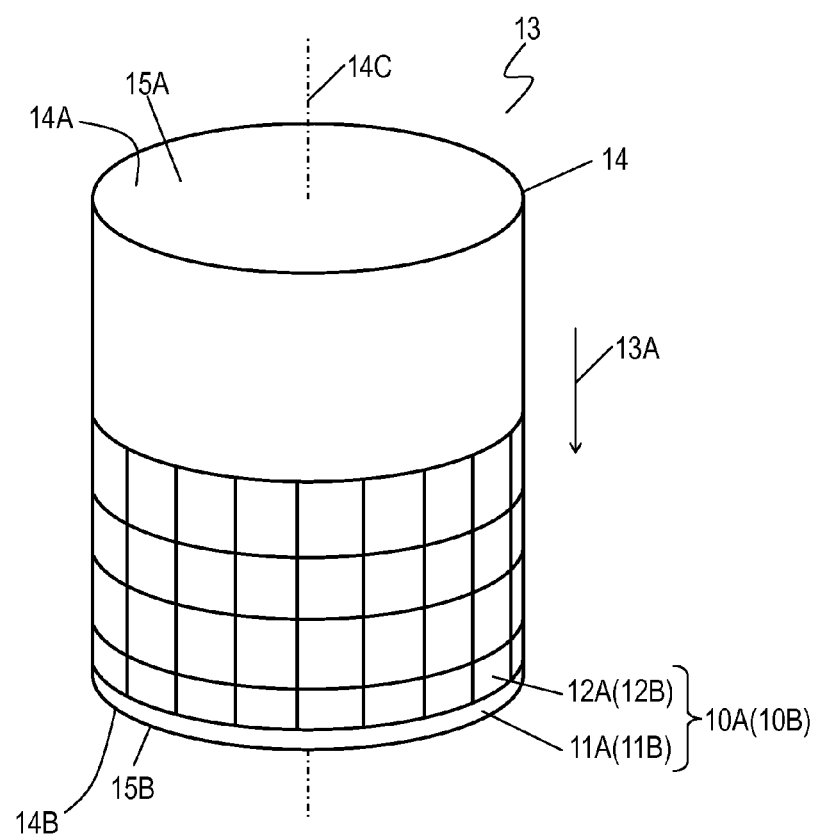
FIG. 1 is a perspective view of a film capacitor in accordance with an exemplary embodiment of the present invention.

FIG. 1 is a perspective view of film capacitor 13 in accordance with an exemplary embodiment of the present invention. Film capacitor 13 includes capacitor element 14 having end surfaces 14A and 14B and external electrodes 15A and 15B which are provided on end surfaces 14A and 14B, respectively. Capacitor element 14 includes a pair of metalized films 10A and 10B which overlap each other and are wound about center axis 14C. External electrodes 15A and 15B are arranged in first direction 13A parallel to center axis 14C.

Figure 2:
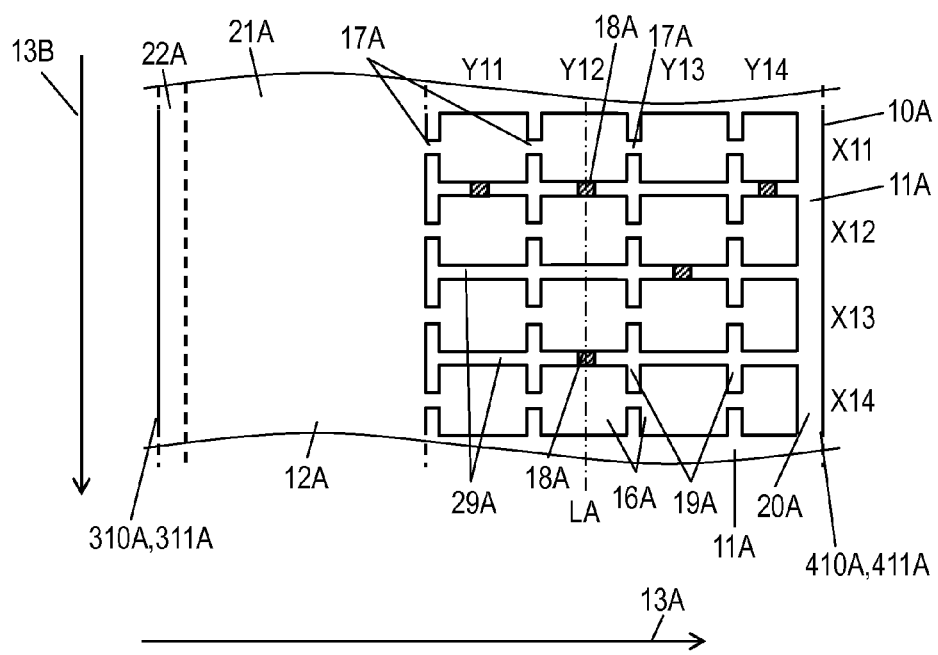
FIG. 2 is a plan view of a metalized film of the film capacitor in accordance with the embodiment.
Figure 2:
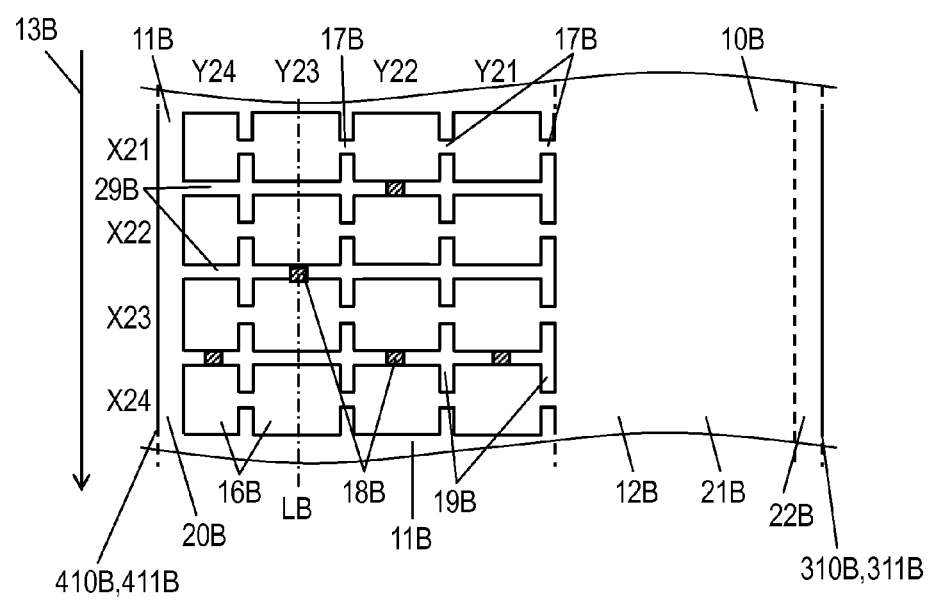

FIG. 2 is a plan view of metalized films 10A and 10B. Metalized films 10A and 10B include dielectric films 11A and 11B and electrode films 12A and 12B provided on dielectric films 11A and 11B, respectively. Electrode film 12A of metalized film 10A functions as a positive electrode of the film capacitor while electrode film 12B functions as a negative electrode of the film capacitor.

Metalized film 10A (dielectric film 11A) has ends 310A and 410A (ends 311A and 411A) opposite to each other in first direction 13A. Metalized film 10B (dielectric film 11B) has ends 310B and 410B (ends 311B and 411B) opposite to each other in first direction 13A. In capacitor element 14 including metalized films 10A and 10B overlapping each other and wound about center axis 14C, end 310A (end 311A of dielectric film 11A) constitutes end surface 14A of capacitor element 14. End 310B (end 311B of dielectric film 11B) constitute end surface 14B of capacitor element 14. End 410A (end 411A of dielectric film 11A) of metalized film 10A may reach end surface 14B of capacitor element 14, but does not necessarily reach end surface 14B of capacitor element 14. End 410B (end 411B of dielectric film 11B) may reach end surface 14A of capacitor element 14, but does not necessarily reach end surface 14A of capacitor element 14.

Electrode film 12A reaches end 310A of metalized film 10A (end 311A of dielectric film 11A). External electrode 15A disposed on end surface 14A of capacitor element 14 is connected to electrode film 12A at end 310A of metalized film 10A (end 311B of dielectric film 11B). Similarly, electrode film 12B reaches end 310B of metalized film 10B (end 311B of dielectric film 11B). External electrode 15B disposed on end surface 14B of capacitor element 14 is connected to electrode film 12B at end 310B of metalized film 10B (end 311B of dielectric film 11B). Electrode film 12A is isolated from end 410A of metalized film 10A (end 411A of dielectric film 11A) and does not reach end surface 14B of capacitor element 14, so that electrode film 12A can be located away from external electrode 15B and cannot be connected to electrode 15B. Metalized film 10A extends to end 410A (end 411A of dielectric film 11A) and has insulating margin 20A in which electrode film 12A is not formed. Similarly electrode film 12B is isolated from end 410B of metalized film 10B (end 411B of dielectric film 11B) and does not reach end surface 14A of capacitor element 14, so that electrode film 12B can be located away from external electrode 15A and cannot be connected to electrode 15A. Metalized film 10B extends to end 410B (end 411B of dielectric film 11B) and has insulating margin 20B in which electrode film 12B is not formed.

As shown in FIG. 1, metalized films 10A and 10B are stacked on each other and are wound such that electrode films 12A and 12B face each other across dielectric film 11A or 11B. First direction 13A is directed from external electrode 15A toward external electrode 15B.

As shown in FIG. 2, Electrode film 12A includes electrode segments 16A, first fuses 17A connecting electrode segments 16A to each other, multiple second fuses 18A connecting electrode segments 16A to each other, electrode portion 21A, and low-resistance portion 22A. Electrode segments 16A are arranged in a matrix form in first direction 13A in which external electrodes 15A and 15B are placed and in second direction 13B perpendicular to first direction 13A. First fuses 17A connect electrode segments 16A to each other which are adjacent to each other in first direction 13A. Second fuses 18A connect electrode segments 16A to each other which are adjacent to each other in second direction 13B. Electrode segments 16A are arranged in second direction 13B to form columns Y11-Y14. Electrode segments 16A are arranged in first direction 13A to form rows X11-X14. Although FIG. 2 shows four rows X11-X14, metalized film 10A extends so long in second direction 13B that electrode segments 16A form a large number of rows ( . . . , X11, . . . , X14, . . . ). Electrode segments 16A thus form a matrix formed of rows ( . . . , X11, . . . , X14, . . . ) and columns (Y11-Y14). The number of the columns formed of electrode segments 16A arranged in second direction 13B can be two, three, or more than four.

Similarly, electrode film 12B shown in FIG. 2 includes electrode segments 16B, first fuses 17B connecting electrode segments 16B to each other, second fuses 18B connecting the multiple electrode segments 16B to each other, electrode portion 21B, and low-resistance portion 22B. Electrode segments 16B are arranged in a matrix form, namely, arranged in first direction 13A and in second direction 13B. First fuses 17B connect electrode segments 16B to each other which are adjacent to each other in first direction 13A. Second fuses 18B connect electrode segments 16B to each other which are adjacent to each other in second direction 13B. Electrode segments 16B are arranged in second direction 13B to form columns Y21-Y24. Electrode segments 16B are arranged in first direction 13A to form rows X21-X24. Although FIG. 2 shows only four rows X21-X24, metalized film 10B extends so long in second direction 13B that electrode segments 16B form a large number of rows ( . . . , X21, . . . , X24, . . . ). Electrode segments 16B thus form a matrix formed of rows ( . . . , X21, . . . , X24, . . . ) and columns (Y21-Y24). The number of the columns formed of electrode segments 16B arranged in second direction 13B can be two, three, or more than four.

Electrode segments 16A are separated from each other by first slits 29A extending in first direction 13A and second slits 19A extending in second direction 13B. Electrode segments 16B are separated from each other by first slits 29B extending in first direction 13A and second slits 19B extending in second direction 13B. Before electrodes films 12A and 12B are formed, slits 19A, 19B, 29A, and 29B may be formed by providing oil-coating on portions of dielectric films 11A and 11B to become slits 19A, 219B, 20A, and 20B so as to prevent metal material of electrode films 12A and 12B from being vapor-deposited on the portions of dielectric films 11A and 11B. Fuses 17A, 17B, 18A, and 18B are formed by providing oil-coating so as to partially prevent the metal material from being vapor-deposited.

Electrode segments 16A and 16B can be formed entirely on electrode films 12A and 12B, respectively, or can be formed partially within a limited width of the entire width of electrode films 12A and 12B in first direction 13A.

In the case that electrode segments 16A are formed partially, electrode segments 16A are preferably formed closer to end 410A (411A) opposite to external electrode 15A to be connected to electrode segments 16A than to end 410B (411B). In the case that electrode segments 16B are formed partially, electrode segments 16B are formed preferably closer to end 410B (411B) opposite to external electrode 15B to be connected to electrode segments 16B than to end 410B (411B). Since large currents flow near external electrodes 15A and 15B, electrode segments 16A are preferably formed at positions having a smaller current density so as to reduce heat generation. In film capacitor 13 in accordance with this embodiment, electrode film 12A includes electrode portion 21A connected to end 310A of metalized film 10A (end 311A of dielectric film 11A). Electrode portion 21A is not separated either in first direction 13A or in second direction 13B. Electrode segments 16A are located farther from end 310A (311A) than electrode portion 21A in first direction 13A, and are connected to electrode portion 21A via fuses 17A. Electrode film 12B includes electrode portion 21B connected to end 310B of metalized film 10B (end 311B of dielectric film 11B). Electrode portion 21B is not separated either in first direction 13A or in second direction 13B. Electrode segments 16B are located farther from end 310B (311B) than electrode portion 21B in first direction 13A, and are connected to electrode portion 21B via fuses 17B. In film capacitor 13 in accordance with the embodiment, electrode segments 16A are provided on electrode film 12A from around the center to insulating margin 20A in first direction 13A. Electrode segments 16B are provided on electrode film 12B from around the center to insulating margin 20B in first direction 13A. This structure allows electrode segments 16A formed on electrode film 12A of capacitor element 14 to face electrode portion 21B of electrode film 12B across dielectric film 11A or 11B, and allows electrode segments 16B formed on electrode film 12B to face electrode portion 21A of electrode film 12A across dielectric film 11A or 11B, thereby forming a capacitance of film capacitor 13.

Electrode film 12A includes low-resistance portion 22A disposed along end 310A of metalized film 10A (end 311A of dielectric film 11A). Electrode film 12B includes low-resistance portion 22B disposed along end 310B of metalized film 10B (end 311B of dielectric film 11B). Low-resistance portions 22A and 22B are locally thicker portions of electrode films 12A and 12B, respectively, so that low-resistance portions 22A and 22B may be thicker than electrode segments 16A and 16B and electrode portions 21A and 21B. Electrode films 12A and 12B thus can be connected to external electrodes 15A and 15B firmly at low-resistance portions 22A and 22B with low resistance, respectively, hence providing capacitor element 14, namely, of film capacitor 13 with a low resistance.

In capacitor element 14 in accordance with this embodiment, first fuse 17A connects electrode segments 16A adjacent to each other in first direction 13A. First fuse 17B connects electrode segments 16B adjacent to each other in first direction 13A. This structure allows an electric current to flow in first direction 13A, and reduces lengths of electrical paths between external electrode 15A and electrode segments 16A and between external electrode 15B and electrode segments 16B, hence providing capacitor element 14 with a low resistance. Only some of electrode segments 16A may be connected to with first fuses 17A, and only some of electrode segments 16B may be connected with first fuses 17B; however, as discussed above, all of electrode segments 16A are preferably connected with first fuses 17A, and all of electrode segment 16B are preferably connected with first fuses 17B to reduce a resistance of capacitor element 14.

Second fuses 18A (18B) connect some of electrode segments 16A (16B) adjacent to each other in second direction 13B. Second fuses 18A are disposed dispersedly in columns Y11-Y14 (Y21-Y24) formed of electrode segments 16A (16B). A width of second fuse 18A (18B) in first direction 13A is smaller than a width of first fuse 17A (17B) in second direction 13B. In capacitor element 14, electric field is applied in first direction 13A connecting external electrodes 15A and 15B, so that a large current may flow through electrode films 12A and 12B along first direction 13A rather than along second direction 13B. A large current flows first fuses 17A and 17B that connect electrode portions 21A and 21B to electrode segments 16A and 16B in first direction 13A than through second fuses 18A and 18B that connect electrode segments 16A and 16B in second direction 13B, so that a large width of first fuses 17A and 17B may effectively reduce the resistance of film capacitor 13. Since second fuses 18A and 18B are not involved in connection between electrode segments 16A and 16B along the current main-flowing direction, since second fuses 18A and 18B affect little the resistance of film capacitor 13. A small width of second fuses 18A and 18B can be fused more easily, thereby enhancing the function of fuse.

In metalized films 10A and 10B shown in FIG. 2, at least one second fuse 18A is provided in each of columns Y11-Y14, and there are electrode segments 16A which are adjacent to each other in second direction 13B but which are not connected to each other with second fuse 18A in each of columns Y11-Y14. Similarly, at least one second fuse 18B is provided in each of columns Y21-Y24, and there are electrode segments 16B which are adjacent to each other in second direction 13B and which are not connected to each other with second fuse 18B in each of columns Y21-Y24. In metalized films 10A and 10B of film capacitor 13 in accordance with this embodiment, all of electrode segment 16A in some of columns Y11-Y14 may be connected to each other with second fuses 18A while all of electrode segments 16B in some of columns Y21-Y24 may be connected to each other with second fuses 18B.

Material and structure of each structural element will be detailed below.

Dielectric films 11A and 11B are made of film, such as polypropylene, polyethylene terephthalate, polyethylene naphthalene, polyphenols sulfide or polystyrene.

Electrode films 12A and 12B are made of metal, such as aluminum, alloy of aluminum, magnesium, silicon, and zinc, or zinc. Aluminum has rather low resistance although it is thin, so that it can enhance the self-healing properties. Electrode films 12A and 12B can be formed by, e.g. a deposition method, and their low-resistance portions 22A and 22B can be formed locally thicker than the other sections by depositing the metal. In this embodiment, low-resistance portions 22A and 22B are formed by depositing the alloy of aluminum and zinc.

External electrodes 15A and 15B are made of metal such as aluminum, zinc, or alloy of aluminum and one of zinc and silicon. External electrodes 15A and 15B are formed by, e.g. spraying the above metal onto end surfaces 14A and 14B of capacitor element 14.

As discussed above, plural electrode segments 16A (16B) are separated by first slits 29A (29B) extending in the first direction 13A and second slits 19A (19B) extending in a second direction 13B perpendicular to the first direction 13A. Plural electrode segments 16A (16B) are arranged in a matrix form including plural rows X11-X14 (X21-X24) arranged in the first direction 13A and plural columns Y11-Y14 (Y21-Y24) arranged in the second direction 13B. First fuses 17A are located at second slits 19A (19B) so as to connect electrode segments 16A (16B) out of the plural electrode segments 16A (16B) adjacent to each other in the first direction 13A. Second fuses 18A (18B) are located at first slits 29A (29B) so as to connect electrode segments 16A (16B) out of the plural electrode segments 16A (16B) adjacent to each other in the second direction 13B. At least one of second fuses 18A (18B) is located at each of first slits (29A (29B). Plural columns V11-V14 (Y21-Y24) of electrode segments 16A (16B) include a farthest column Y14 (Y24) farthest from the first external electrode 15A (15B) among plural columns Y11-Y14 (Y21-Y24) of the electrode segments 16A (16B) and one or more other columns Y11-Y13 (Y21-Y23) other than the farthest column Y11 (Y21). In each of the one or more other columns Y11-Y13 (21-Y23), at least one electrode segment 16A (16B) of two electrode segments 16A (16B) out of the plural electrode segments 16A (16B) adjacent to any one of the electrode segments 16A (16B) in the second direction 13B is electrically disconnected from the any one of the electrode segments 16A (16B) in the second direction 13B.

Widths of second fuses 18A (18B) in the first direction 13A may be smaller than widths of first fuses 17A (17B) in the second direction 13B.

First fuses 17A (17B) may connects all electrode segments 16A (16B) out of the plural electrode segments 16A (16B) disposed in each of plural rows X11-X14 (X21-X24) to each other.

Samples of film capacitor 13 in accordance with the embodiment are produced and evaluated.

EXAMPLE 1

A capacitor element used in Example 1 includes, as shown in FIG. 2, electrode segments 16A forming four columns Y11-Y14 each of which is constituted by electrode segments 16A arranged in second direction 13B, and electrode segments 16B forming four columns Y21-Y24 each of which is constituted by electrode segments 16B arranged in second direction 13B.

In Example 1, second fuses 18A are provided in each of four columns Y11-Y14, and second fuses 18B are provided in each of four columns Y21-Y24. Second fuses 18A and 18B dispersedly arranged in the columns as above are prevented from overlapping each other on in wound metalized films 10A and 10B. In Example 1, the number of second fuses 18A provided in each of four columns Y11-Y14 is substantially equal to the number of second fuses 18B provided in respective one of four columns Y21-Y24. In Example 1, widths of second fuses 18A and 18B in first direction 13A are smaller than widths of first fuses 17A and 17B in second direction 13B. In a column (column Y12) out of four columns Y11-Y14 which includes plural second fuses 18A, second fuses 18A are located on straight line LA parallel to second direction 13B. Similarly, a column (column Y22) out of four columns Y21-Y24 which includes plural second fuses 18B, fuses 18B are located placed on straight line LB parallel to second direction 13B. In Example 1, the total number of second fuses 18A is about 30% of the total number of electrode segments 16A while the total number of second fuses 18B is about 30% of the total number of electrode segments 16B. In each of columns Y11-Y14, there are electrode segments 16A which are adjacent to each other in second direction 13B but are not connected to each other with second fuse 18A. Similarly, in each of columns Y21-Y24, there are electrode segments 16B which are adjacent to each other in second direction 13B but are not connected to each other with second fuse 18B.

In Example 1, electrode films 12A and 12B are made by vapor-depositing aluminum mainly, and external electrodes 15A and 15B are formed by spraying zinc. Alloy of aluminum and zinc is vapor-deposited on electrode films 12A and 12B at ends 310A, 310B, 311A, and 311B to form low-resistance portions 22A and 22B. Low-resistance portions 22A and 22B connect electrode films 12A and 12B to external electrodes 15A and 15B in a preferable condition, respectively, hence providing capacitor element 14 with a low resistance.

EXAMPLE 2

Figure 3:
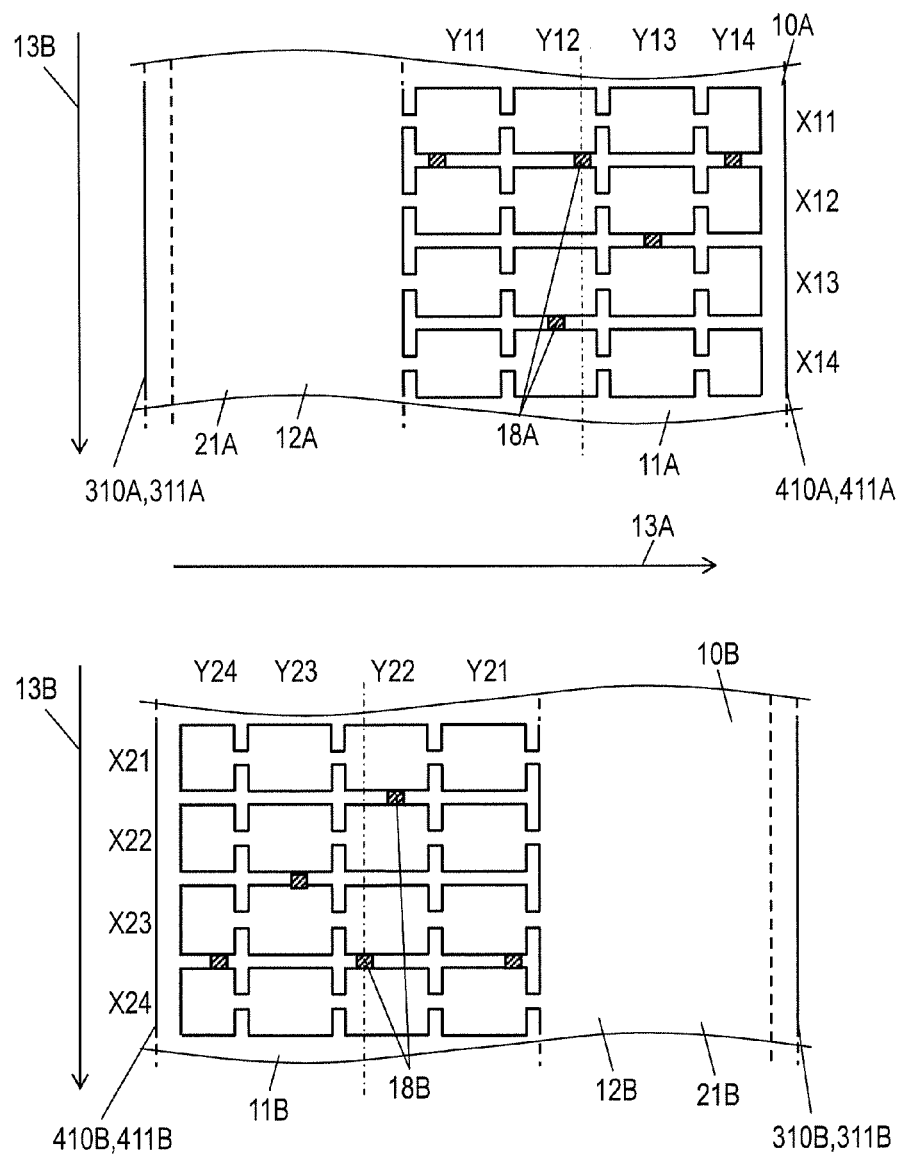
FIG. 3 is a plan view of a metalized film of the film capacitor in accordance with the embodiment.

FIG. 3 is a plan view of metalized films 10A and 10B included in Example 2 of film capacitor 13 in accordance with the embodiment. Metalized films 10A and 10B used in Example 2 is different from those used in Example 1 only in the positions of second fuses 18A and 18B. Second fuses 18A adjacent to each other in second direction 13B deviate from each other in first direction 13A while second fuses 18B adjacent to each other in second direction 13B deviate from each other in first direction 13A. To be more specific, in a column (column Y12) including plural second fuses 18A, second fuses 18A are not located on one straight line parallel to second direction 13B while, in a column (column Y22) including plural second fuses 18B, second fuses 18B are not located on one straight line parallel to second direction 18B.

Figure 4:
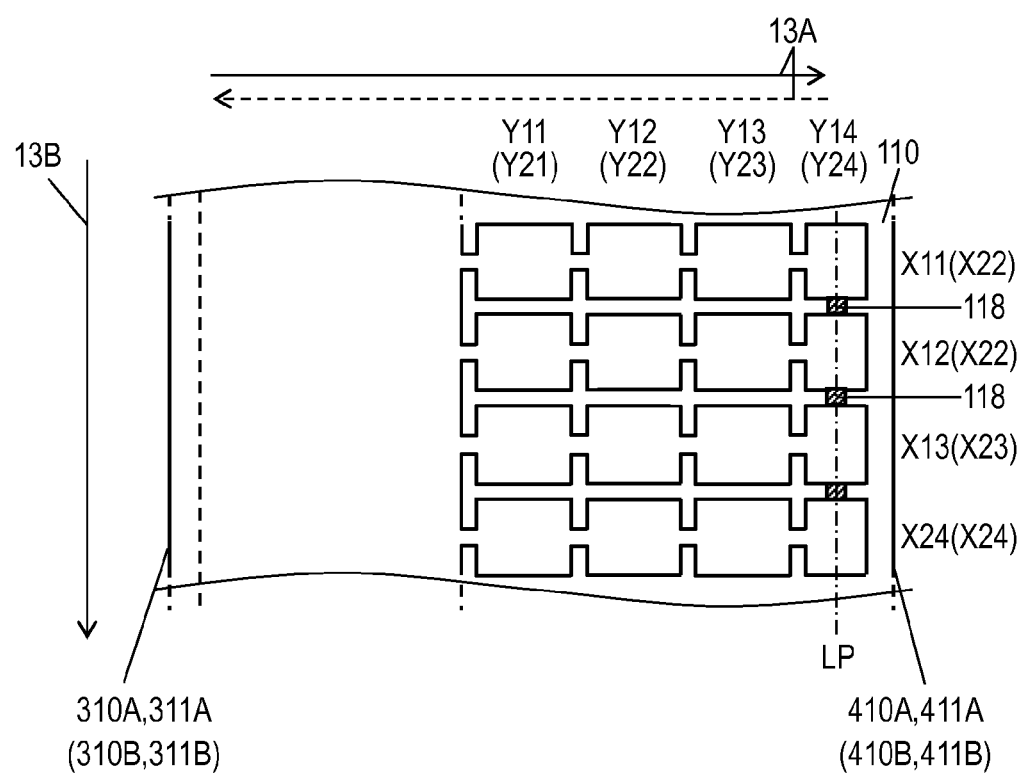
FIG. 4 is a plan view of a metalized film of a comparative example of a film capacitor.

FIG. 4 is a plan view of metalized film 110 of Comparative Example 1 of a film capacitor. Metalized film 110 is different from metallized films 10A and 10B of Example 1 only in the positions of second fuses 118. A pair of metalized films 110 are stacked on each other and wound together, thereby producing Comparative Example 1 of the film capacitor similarly to Example 1 of the film capacitor. In Comparative Example 1, second fuses 118 are provided only in columns Y14 and Y24. In other words, second fuses 118 are not dispersed in columns Y11-Y14 and Y21-Y24, but are provided in columns Y14 and Y24. To be more specific, second fuses 118 are located on center axis LP of each of columns Y14 and Y24, so that second fuses 118 do not deviate in first direction 13A but are arranged on one straight line.

Samples of film capacitors employing metalized films 10A and 10B of Examples 1 and 2 and metalized film 110 employed in Comparative Example 1 are produced, and subjected to a withstanding voltage test. In this test, a predetermined voltage is applied between external electrodes 15A and 15B in atmosphere of 100° C., and then, it is determined visually whether fine though-holes are formed in dielectric films 11A and 11B or not (fine through-hole break occurs or not). Electrode films 12A and 12B having various thicknesses are produced for the samples of Examples 1 and 2 and Comparative Example 1. The sheet resistance of each of electrode films 12A and 12B of these samples is set at 11Ω/□, 13Ω/□, and 15Ω/□.

Table 1 shows presence of the through-holes in the samples of Examples 1 and 2 and Comparative Example 1 after the withstanding voltage test. The test is preformed three times to each sample. In Table 1, a letter "A" represents samples with no fine through-hole therein, a letter "C" represents samples with fine through-holes found in twice or more in the three-time tests.

TABLE 1

| Sheet Resistance (Ω/□) | Example 1 | Example 2 | Comparative Example 1 |
|---|---|---|---|
| 11 | C | A | C |
| 12 | A | A | C |
| 15 | A | A | C |

As shown in Table 1, in Example 1, when electrode films 12A and 12B are rather thin (the sheet resistance is not smaller than 13Ω/□), no fine through-hole break is found, and thus, the samples of Example 1 exhibit more preferable withstanding voltage performance than the samples of Comparative Example 1. In Example 2, electrode films 12A and 12B are thick (low sheet resistance) and prevent the fuses from being fused easily, but have no fine through-hole break found, and the samples of Example 2 exhibit more preferable withstanding voltage performance than the samples of example 1.

The reason of the test result is that in wound metalized films 10A and 10B of Example 2, only a few of second fuses 18A and 18B overlap each other. To be more specific, in Examples 1 and 2, second fuses 18A and 18B are dispersedly arranged in columns Y11-Y14 and Y21-Y24. Particularly in Example 2, second fuses 18A and 18B deviate from each other in each of columns Y11-Y14 and Y21-Y24 in first direction 13A. This arrangement prevents second fuses 18A and 18B from overlapping each other while metalized films 10A and 10B are wound. Second fuses 18A and 18B employed in Examples 1 and 2 has small widths, so that second fuses 18A and 18B may be fused easily. However, if one of second fuses 18A and 18B is fused, other second fuses 18A and 18B continue to work stably, hence increasing the withstanding voltage.

Samples of Comparative Example 1, on the other hand, have all of second fuses 118 provided in one column Y14 and one column Y24, and more specifically, are located on center axes LP of columns Y14 and Y24. While metalized film 110 is wound, a lot of second fuses 118 overlap each other. When a certain second fuse out of second fuses 118 is fused, other second fuses 118 overlapping the certain second fuse are affected in performance, and are hardly fused, so that the fine through-hole break occurs.

Film capacitors 13 of Examples 1 and 2 allow few of second fuses 18A and 18B to overlap each other while metalized films 10A and 10B are wound, hence increasing the withstanding voltage of film capacitors 13. The sample of Example 2 allows electrode films 12A and 12B to be thin, accordingly improving the self-healing property.

Figure 7:
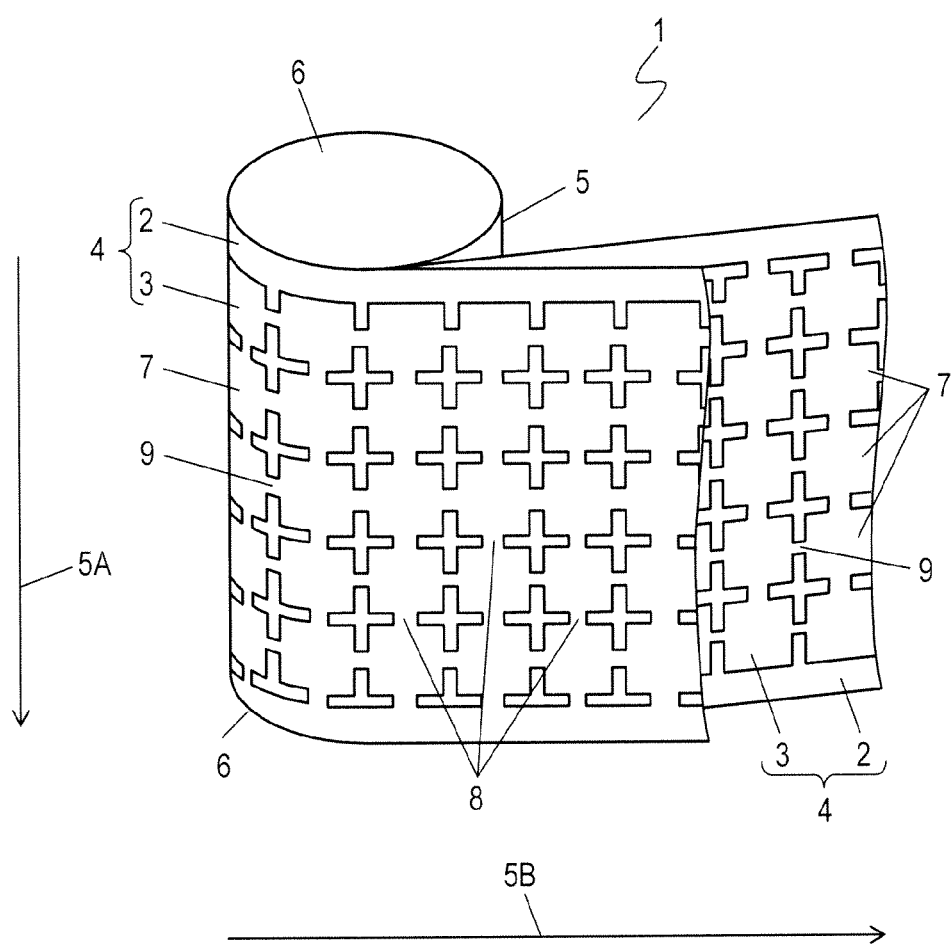
FIG. 7 is a perspective view of a conventional film capacitor.

In conventional film capacitor 1 shown in FIG. 7, fuses 8 and 9 may not increase the withstanding voltage stably. In capacitor element 5, some second fuses 9 overlap another second fuse 9 via dielectric film 2.

When certain second fuse 9 is fused first, dielectric film 2 may change its properties due to the heat by the fusing, or other second fuses 9 may be prevented from being fused due to a gas pressure generated at the fusing. In such a state, if a defect occurs in the electrode films due to an electric current over the rated current flowing thereto, since the other second fuses 9 are hardly fused, electrode segments 7 including the defect cannot be separated, and may generate fine through-hole break, namely insulation breakdown.

Particularly in the case that a lot of second fuses 9 are arranged on one straight line, the fuses tend to overlap each other via a dielectric film when metalized films are stacked and wound together, so that the other second fuses 9 can be affected easily. A small width of fuse 9 enhances the function as a fuse; however, the other fuses 9 tend to be affected more easily. As a result, film capacitor 1 cannot increase the withstanding voltage stably.

Film capacitor 13 in accordance with the embodiment allows second fuses 18A and 18B to hardly overlap each other while metalized films 10A and 10B are wound together, so that the withstanding voltage can be increased. Particularly in Example 2, thinner electrode films 12A and 12B can improve the healing property.

EXAMPLE 3

Example 3 is different from Example 1 in the number of second fuses 18A and 18B. In Example 3, the ratio Rn of the total number of second fuses 18A to the total number of electrode segments 16A is 5% while the ratio Rn of the total number of second fuses 18B to the total number of electrode segments 16B is 5%. Second fuses 18A are dispersedly arranged in plural columns Y11-Y14, similarly to Example 1. In each of columns Y11-Y14, second fuses 18A adjacent to each other deviate from each other in first direction 13A. Second fuses 18B are dispersedly arranged in plural columns Y21-Y24, and second fuses 18B adjacent to each other deviate from each other in first direction 13A.

EXAMPLE 4

Example 4 is different from Example 1 in the number of second fuses 18A and 18B. In Example 4, the ratio Rn of the total number of second fuses 18A to the total number of electrode segments 16A is 10% while the ratio Rn of the total number of second fuses 18B to the total number of electrode segments 16B is 10%. Second fuses 18A are dispersedly arranged in plural columns Y11-Y14. In each of columns Y11-Y14, second fuses 18A adjacent to each other deviate from each other in first direction 13A. Second fuses 18B are dispersedly arranged in plural columns Y21-Y24, and second fuses 18B adjacent to each other deviate from each other in first direction 13A.

EXAMPLE 5

Example 5 is different from Example 1 in the number of second fuses 18A and 18B. In Example 5, the ratio Rn of the total number of second fuses 18A to the total number of electrode segments 16A is 20% while the ratio Rn of the total number of second fuses 18B to the total number of electrode segments 16B is 20%. Second fuses 18A are dispersedly arranged in plural columns Y11-Y14. In each of columns Y11-Y14, second fuses 18A adjacent to each other deviate from each other in first direction 13A. Second fuses 18B are dispersedly arranged in plural columns Y21-Y24, and second fuses 18B adjacent to each other deviate from each other in first direction 13A.

EXAMPLE 6

Example 6 is different from Example 1 in the number of second fuses 18A and 18B. In Example 6, the ratio Rn of the total number of second fuses 18A to the total number of electrode segments 16A is 35% while the ration Rn of the total number of second fuses 18B to the total number of electrode segments 16B is 35%. Second fuses 18A are dispersedly arranged in plural columns Y11-Y14. In each of columns Y11-Y14, second fuses 18A adjacent to each other deviate from each other in first direction 13A. Second fuses 18B are dispersedly arranged in plural columns Y21-Y24, and second fuses 18B adjacent to each other deviate from each other in first direction 13A.

EXAMPLE 7

Example 7 is different from Example 1 in the number of second fuses 18A and 18B. In Example 7, the ratio Rn of the total number of second fuses 18A to the total number of electrode segments 16A is 40% while the ratio Rn of the total number of second fuses 18B to the total number of electrode segments 16B is 40%. Second fuses 18A are dispersedly arranged in plural columns Y11-Y14. In each of columns Y11-Y14, second fuses 18A adjacent to each other deviate from each other in first direction 13A. Second fuses 18B are dispersedly arranged in plural columns Y21-Y24, and second fuses 18B adjacent to each other deviate from each other in first direction 13A.

Table 2 shows presence or absence of the fine through-hole break after the withstanding voltage test performed for Examples 3 to 7. Each sample is subjected to the test three times. In Table 2, a letter "A" represents a sample having no fine through-hole formed therein at the test of three times, and a letter "B" represents a sample having fine through-holes formed therein at the tent once out of three times.

TABLE 2

|  | Example 3 | Example 4 | Example 5 | Example 6 | Example 7 |
|---|---|---|---|---|---|
| Ratio Rn (%) | 5 | 10 | 20 | 35 | 40 |
| Evaluation Result | A | A | A | A | B |

As shown in Table 2, the ratio Rn of the total number of second fuses 18A (18B) to the total number of electrode segments 16A (16B) not larger than 35% can increase the withstanding voltage. Since a larger number of electrode segments 16A and 16B requires a larger number of second fuses 18A and 18B connected thereto, when an excessively large current flows, some of second fuses 18A and 18B may not be fused. As a result, electrode segments 16A and 16B with defects can be neither insulated nor isolated, thereby producing the fine through-hole break.

Samples of film capacitor are produced. In these samples, a metalized film including second fuses 18A disposed in only one of columns Y11-Y14 and another metalized film including second fuses 18B disposed in only one of columns Y21-Y24 stacked and wound together. In each sample, second fuses 18A connect all the electrode segments 16A adjacent to each other in second direction 13B in respective one of columns Y11-Y14, and second fuses 18B connect all electrode segments 16B adjacent to each other in second direction 13B disposed in respective one of columns Y21-Y24. These samples are subject to a voltage step-up test. In the step-up test, a voltage applied between external electrodes 15A and 15B of each sample in atmosphere of 100° C., and the voltage is increased by a predetermined voltage every predetermined time. A capacitance change ratio of the capacitance of each sample before increasing the voltage to the capacitance of each sample after increasing the voltage is obtained. Then, voltage Vf at which the capacitance change ratio becomes 15% is measured. Table 3 shows voltage Vf of each sample.

TABLE 3

|  | Position of Fuses 18A/18B | | | |
|---|---|---|---|---|
|  | Column Y11/Y21 | Column Y12/Y22 | Column Y13/Y23 | Column Y14/Y24 |
| Voltage Vf (V) | 1150 | 1250 | 1250 | 1300 |

As shown in Table 3, second fuses 18A and 18B disposed in columns Y14 and Y24 closest to ends 410A and 410B (411A and 411B) opposite to ends 310A and 310B (311A and 311B) to be connected to external electrodes 15A and 15B provide the capacitors with higher voltage Vf and smaller capacitance change ratio than second fuses 18A and 18B disposed in columns Y11 and Y21 closest to ends 310A and 310B (311A and 311B) to be connected to external electrodes 15A and 15B, respectively. A reason for the above result is that, when first fuses 17A and 17B or second fuses 18A and 18B are fused and isolate certain electrode segments 16A and 16B, other electrode segments 16A and 16B affected by these isolated certain fuses can no more form the capacitance of film capacitor 13. In the case that second fuses 18A and 18B are disposed in columns Y11 and Y21 closest to ends 310A and 31B (311A and 311B) to be connected to external electrodes 15A and 15B, respectively, isolation of certain electrode segments 16A and 16B disable electrode segments 16A and 16B connected to the isolated electrode segments to form the capacitance. On the other hand, in the case that second fuses 18A and 18B are disposed in columns Y14 and Y24 closest to ends 410A and 410B (411A and 411B), namely, closest to insulation margins 20A and 20B, respectively, even if being fused, the number of electrode segments 16A and 16B that cannot form the capacitance due to the fusing of second fuses 18A and 18B is decreased, and prevents the capacitance from decreasing. Thus, second fuses 18A and 18B disposed in columns Y14 and Y24 closest to insulation margins 20A and 20B, namely, ends 410A and 410B (411A and 411B), respectively, decreases the capacitance change ratio.

As described above, second fuses 18A and 18B are preferably arranged in columns Y11-Y14 and Y21-Y24 dispersedly, and the number of second fuses 18A and 18B is preferably larger in the columns closer to ends 410A and 410B (411A and 411B) opposite to ends 310A and 310B (311A and 311B) to be connected to external electrodes 15A and 15B than the number of second fuses 18A and 18B in the columns closer to ends 310A and 310B (311A and 311B), respectively.

A preferable structure of film capacitor 13 in actual use will be described below.

Samples of film capacitor 13 Comparative Examples 2 and 3 and Example 8 are produced. Second fuses 18A and 18B of these samples have smaller widths in first direction 13A than the samples of Examples 1-7, and dielectric films 11A and 11B of these samples have larger thicknesses than Examples 1-7. To be more specific, dielectric films 11A and 11B of film capacitors 13 employed in Examples 1-7 have thicknesses of 2.5 μm while dielectric films 11A and 11B employed in Comparative Examples 2 and 3 and Examples 8 have thicknesses of 4.0 μm, so that second fuses 18A and 18B of the samples for Comparative Examples 2 and 3 and Example 8 tend to be fused more easily than those of samples of Examples 1-7. The fusing of the second fuses and the larger thicknesses of dielectric films 11A and 11B allow the samples of Comparative Examples 2 and 3 and Example 8 to more hardly have the fine through-hole break than the samples of Examples 1-7.

COMPARATIVE EXAMPLE 2

Figure 5A:
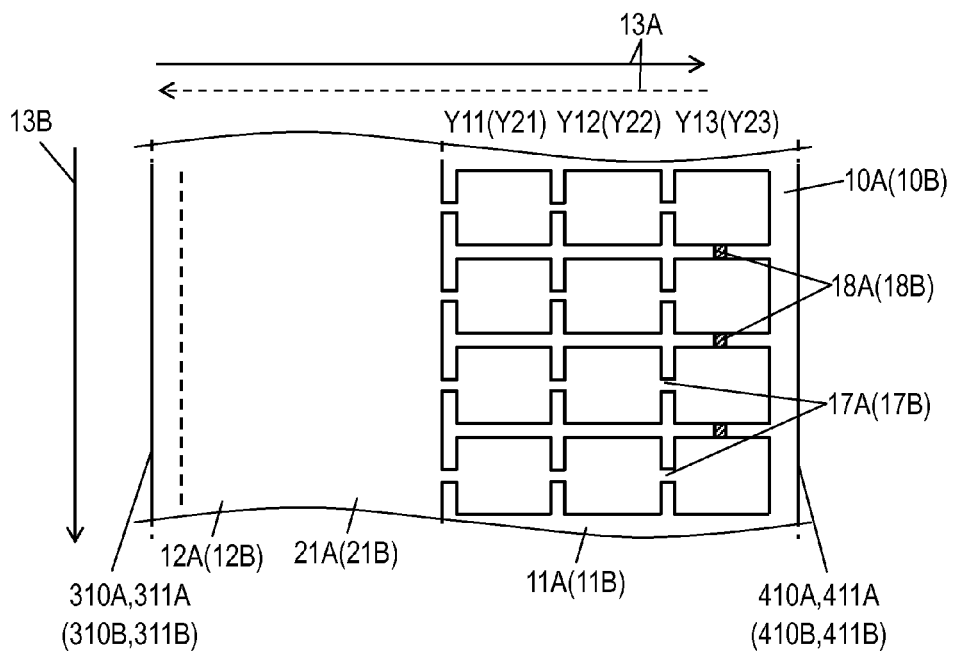
FIG. 5A is a plan view of a metalized film of the comparative example of the film capacitor.

FIG. 5A is a plan view of metalized film 10A (10B) of film capacitor 13 employed in Comparative Example 2. In metalized film 10A (10B), electrode segments 16A (16B) are disposed in three columns Y11-Y3 (Y21-Y23) arranged in second direction 13B. Electrode segments 16A (16B) in column Y11 (Y12) are connected to electrode portions 21A (21B) with first fuses 17A (17B). In column Y13 (Y23) farthest from external electrodes 15A (15B), all electrode segments 16A (16B) disposed in second direction 13B are connected to each other with second fuses 18A (18B). In columns Y11 and Y12 (Y21 and 22), no second fuses 18A (18B) are disposed, so that electrode segments 16A (16B) are not connected to each other with second fuses 18A (18B).

COMPARATIVE EXAMPLE 3

Figure 5B:
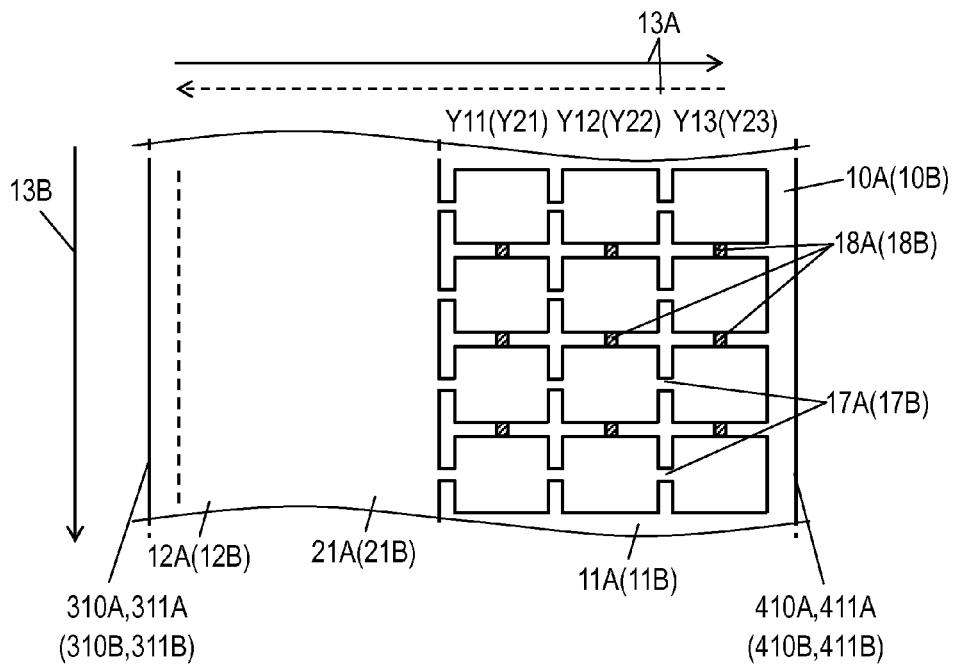
FIG. 5B is a plan view of a metalized film of the comparative example of the film capacitor.

FIG. 5B is a plan view of metalized film 10A (10B) of film capacitor 13 employed in Comparative Example 3. In metalized film 10A (10B), similarly to Comparative Example 2, electrode segments 16A (16B) are disposed in three columns Y11-Y13 (Y21-Y23) arranged in second direction 13B. Electrode segments 16A (16B) in column Y11 (Y12) are connected to electrode portions 21A (21B) with first fuses 17A (17B). In column Y13 (Y23), all electrode segments 16A (16B) disposed in second direction 13B are connected to each other with second fuses 18A (18B).

In columns Y11 and Y12 (Y21 and Y22) of Comparative Example 3, similarly to column Y13 (Y23), all electrode segments 16A (16B) are connected to each other with second fuses 18A (18B). In other words, metalized film 10A (10B) employed in Comparative Example 3 includes certain electrode segments 16A (16B) connected to other electrode segments 16A (16B) surrounding certain electrode segments 16A (16B) with second fuses 18A (18B) and first fuses 17A (17B).

EXAMPLE 8

Figure 5C:
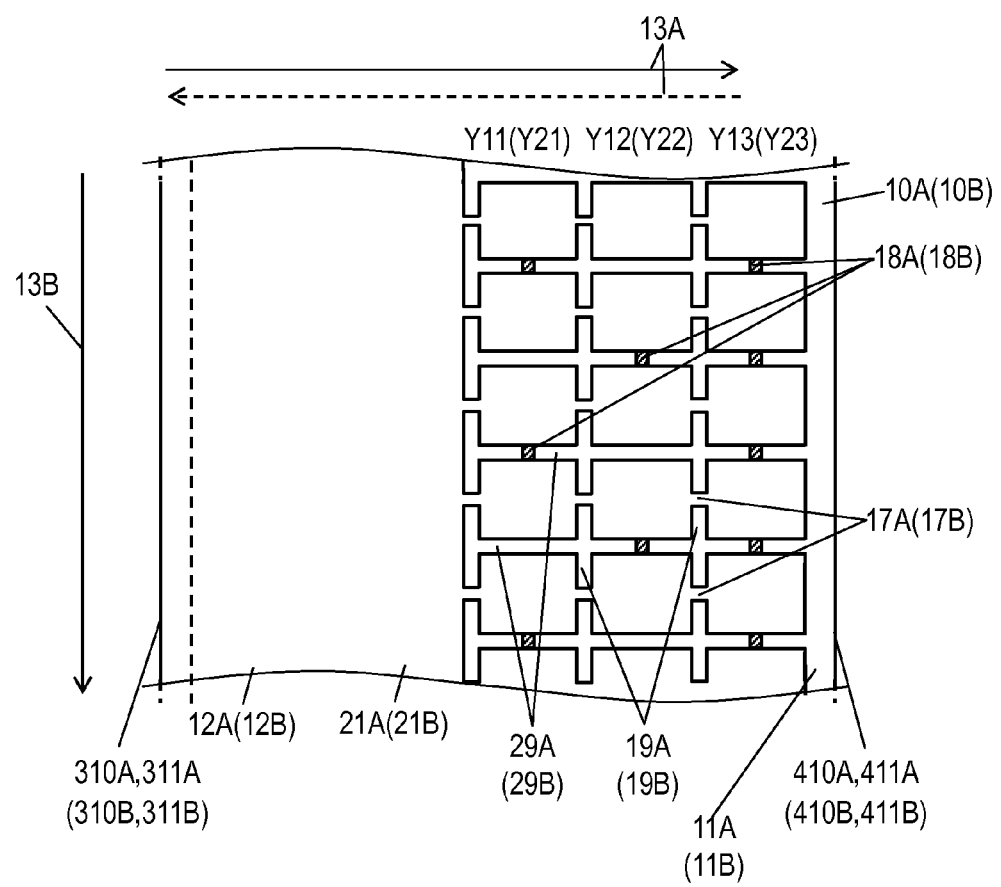
FIG. 5C is a plan view of a metalized film of the film capacitor in accordance with the embodiment.

FIG. 5C is a plan view of metalized film 10A (10B) of film capacitor 13 employed in Example 8. In metalized film 10A (10B), similar to those employed in Comparative Examples 2 and 3, electrode segments 16A (16B) are disposed in three columns Y11-Y13 (Y21-Y23) arranged in second direction 13B. Electrode segments 16A (16B) in column Y11 (Y12) are connected to electrode portions 21A (21B) with first fuses 17A (17B). In column Y13 (Y23), all electrode segments 16A (16B) arranged in second direction 13B are connected to each other with second fuses 18A (18B). Similarly to Comparative Example 2 and 3, all electrode segments 16A (16B) disposed in column Y13 (Y23) farthest from external electrodes 15A (15B) along second direction 13B are connected to each other with second fuses 18A (18B). However, in metalized film 10A (10B) employed in Example 8, second fuses 18A (18B) are arranged dispersedly in columns Y11 and Y12 (Y21 and Y22) except column Y13 (Y23).

To be more specific, second fuses 18A disposed in columns Y11 (Y21) are arranged in second direction 13B while skipping electrode segments at predetermined intervals, namely, one fuse for two electrode segments 16A (16B), so that second fuses 18A. In column Y12 (Y22), similar to in column Y11 (Y12), second fuses 18A (18B) are arranged in the second direction while skipping the electrode segments at given intervals. Each second fuse 18A disposed in column Y11 (Y21) is not adjacent in first direction 13A to each second fuse 18A disposed in column Y12 (Y22), so that in columns Y11 and Y12 (Y21 and Y22), second fuses 18A (18B) disposed in column Y11 and second fuses 18A (18B) disposed in column Y12 are alternately arranged along first direction 13A.

As shown in FIG. 5C, second fuses 18A (18B) are evenly arranged in column Y11 (Y21) and column Y12 (Y22) so that the number of second fuses 18A in column Y11 (Y21) is equal to the number of second fuses 18A in columns Y12 (Y22).

The samples of film capacitor 13 of Comparative Examples 2 and 3 and Example 8 are subjected to a voltage-time test for comparing the life of the samples of capacitors 13. To be more specific, in the voltage-time test, a constant voltage of 1100V is applied between external electrodes 15A and 15B I atmosphere of 105° C. A change ratio of the capacitance of capacitor 13 before applying this voltage to the capacitance of capacitor 13 after applying this voltage is measured. The time when the capacitance change ratio becomes −10% is referred to as a high-temperature life, which is a criterion of the life. Three samples of each of Example 8 and Comparative Examples 2 and 3 are prepared, and thus nine samples in total are subject to the voltage-time test. Three samples of Example 8, for instance, exhibit different test results, and a middle one among the three results is determined as the high-temperature life of film capacitor 13 of Example 8. Similarly, the high-temperature life of film capacitors 13 of Comparative Examples 2 and 3 are determined.

Figure 6A:
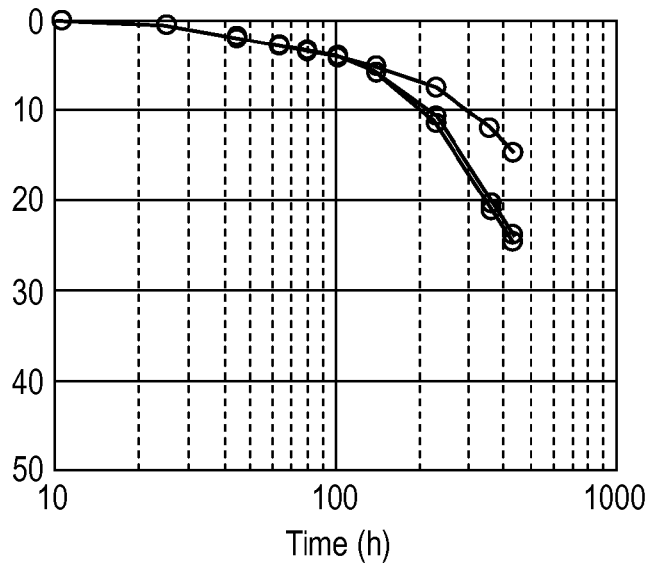
FIG. 6A shows an evaluation result of the comparative example of the film capacitor.
Figure 6B:
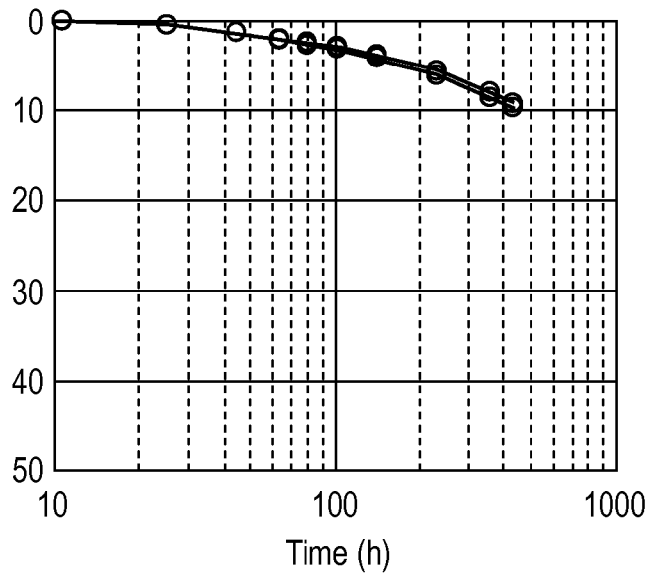
FIG. 6B shows an evaluation result of the comparative example of the film capacitor.
Figure 6C:
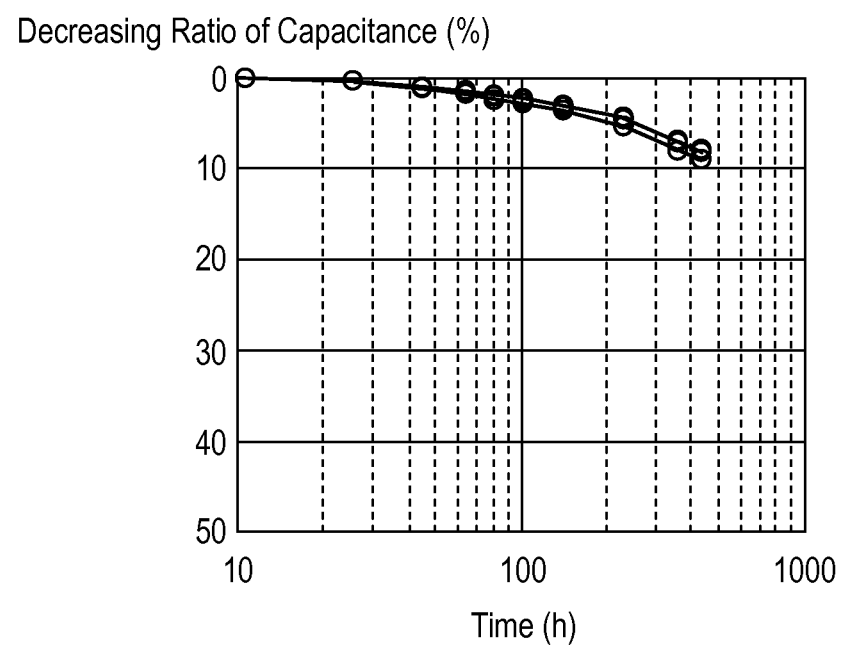
FIG. 6C shows an evaluation result of the film capacitor in accordance with the embodiment.

FIGS. 6A, 6B, and 6C show the results of the voltage-time test performed to the samples of film capacitor 13 of Comparative Examples 2 and 3 and Example 8. In FIGS. 6A-6B, the vertical axis represents a changing ratio of capacitance, and the horizontal axis represents time for which the voltage is applied.

The metalized film capacitor of Comparative Example 2 has a capacitance changing as shown in FIG. 6A, and has a high-temperature life of about 220 hours. The metalized film capacitor of Comparative Example 3 has a capacitance changing as shown in FIG. 6B, and has a high-temperature life of about 440 hours. The metalized film capacitor of Comparative Example 3 has a substantially longer high-temperature life than Comparative Example 2. This is because the metalized film capacitor of Comparative Example 3 allows first fuses 17A (17B) and second fuses 18A (18B) to be fused due to defects in electrode segment 16A (16B), thereby isolating the defective electrode segment 16A (16B) alone. In other words, in the metalized film capacitor of Comparative Example 2, an isolation of a defective electrode segment 16A (16B) isolates simultaneously other electrode segments 16A (16B) connected to the defective one from an electric-current route of the film capacitor, so that the capacitance decreases drastically. On the other hand, in the metalized film capacitor of Comparative Example 3 can isolate the defective electrode segment 16A (16B) alone, so that the capacitance decreases just a little. As a result, the high-temperature life of the metalized film capacitor of Comparative Example 3 is longer than that of the metalized film capacitor of Comparative Example 2.

The metalized film capacitor of Example 8 has a capacitance changing as shown in FIG. 6C, and has a high-temperature life of about 470 hours. In other words, the high-temperature life of film capacitor 13 of Example 8 is longer than that of film capacitor 13 of Comparative Example 3. This is because film capacitor 13 of Example 8 can isolate defective electrode segment 16A (16B) alone similarly to Comparative Example 3, and there are a fewer second fuses 18A (18B) overlap each other in wound metalized film 10A (10B) in Example 8 than in Comparative Example 3. To be more specific, Example 8 suppresses preventing fusing or possibility of malfunction of second fuses 18A (18B) due to smaller chances of overlapping of second fuses 18A (18B), so that second fuses 18A (18B) are appropriately fused for capacitor 13 to work properly.

According to the result of the voltage-time test, the film capacitor of Example 8 has the best property.

Film capacitors 13 of Comparative Example 3 and Example 8 are subjected to a withstanding voltage test to compare their capacitor performances. In the withstanding voltage test, a predetermined voltage is applied between metalized films 10A and 10B in atmosphere at 100° C., and it is determined visually whether the fine through-hole break occurs or not, similarly to the test performed for metalized films 10A and 10B of Examples 1 and 2. Electrode films 12A and 12B of metalized films 10A and 10B employed in Comparative Example 3 and Example 8 have resistance of 12Ω/□.

This test is performed repetitively three times to each sample. The fine through-hole break is visually confirmed in each test for Comparative Example 3 while no fine through-hole break is visually confirmed at all three tests for Example 8.

The fine through-hole break in actual use may degrade the capacitor performance, such as insulation resistance. Film capacitor 13 of Example 8 does not have the fine through-hole break in the withstanding voltage test, and is more reliable than film capacitor 13 of Comparative Example 3. Film capacitor 13 of Example 8 thus maintains a high withstanding voltage stably, and is suitable to be used in a high-voltage condition, such as in an HEV.

As discussed above and as shown in FIG. 5C, plural columns Y11-Y13 (Y21-Y23) includes a first column Y11 or Y12 (Y12 or Y22) and a second column Y13 (Y23) farther from external electrode 15A (15B) than the first column Y11 or Y12. The number of one or more second fuses 18A (18B) out of the second fuses 18A (18B) located in the second column Y13 (Y23) may be larger than the number of one or more second fuses 18A (18B) out of second fuses 18A (18B) located in the first column Y11 or Y12 (Y21 or Y22).

As shown in FIG. 5C, second fuses 18A (18B) may connect all of electrode segments 16A (16B) out of plural electrode segments 16A (16B) disposed in the farthest column Y13 (Y23) to each other.

In each of the one or more other columns Y11 and Y12 (2 and Y22), second fuses 18A (18B) are arranged in the second direction 13B while skipping the electrode segments at predetermined intervals.

In each of other columns Y11 and Y12 (Y21 and Y22), second fuses 18A (18B) may be arranged in the second direction 13B while skipping the second electrode segments at predetermined intervals. The number of one or more second fuses 18A (18B) out of second fuses 18A 818B) may be disposed in each other columns Y11 and Y12 (Y21 and Y22) may be identical to each other.

In two columns Y11 and Y12 (Y21 and Y22) out of other columns Y11 and Y12 (Y21 and Y22) adjacent to each other, second fuses 18A (18B) may be arranged alternately in the second direction 13B.

In each of other multiple columns Y11 and Y12 (Y21 and Y22), second fuses 18A (18B) are arranged in second direction 13B while skipping the second electrodes at predetermined intervals, and the number of one or more second fuses 18A (18B) out of second fuses 18A (18B) disposed in each of other columns Y11 and Y12 (Y21 and Y22) may be equal to each other.

In other columns Y11 and Y12 (Y21 and Y22) out of other columns Y11 and Y12 (Y21 and Y22) adjacent to each other, second fuses 18A (18B) can be alternately arranged in second direction 13B.

Examples 1-8 are roll-type film capacitors 13. A laminated-type film capacitor can also have similar advantages that second fuses 18A (18B) are disposed not to overlap each other to allow narrow second fuses 18A to be fused stably, and increase a withstanding voltage. In laminated-type of film capacitors, a long metalized film 10A (10B) is cut at a predetermined width before being laminated, or the long metalized film is wound to have a large diameter before being cut. This configuration allows second fuses 18A (18B) to be arranged randomly similarly to Examples 1-8, and prevents the second fuses from overlapping each other.

In Examples 1-8, metalized films 10A and 10B functioning as positive and negative electrodes have the same structure; however, only one of metalized films 10A and 10B may include the electrode segments (16A, 16B), the first fuses (17A, 17B), and the second fuses (18A, 18B). Another metalized film can include no slits. Even in this case, film capacitor 13 has a high withstanding voltage.

INDUSTRIAL APPLICABILITY

A film capacitor according to the present invention has a preferable withstanding voltage property, and is used as a capacitor to be used in a variety of electronic devices, electric apparatuses, industrial machines, and automobiles. This film capacitor is useful particularly to automobiles that require a high withstanding voltage.

DESCRIPTION OF REFERENCE MARKS 10A, 10B Metalized Film
11A, 11B Dielectric Film
12A, 12B Electrode Film
13 Film Capacitor
14 Capacitor Element
15A, 15B External Electrode
16A, 16B Electrode segment
17A, 17B First Fuse
18A, 18B Second Fuse
19A, 19B Second Slit
29A, 29B First Slit

The invention claimed is:
1. A film capacitor comprising:
a capacitor element having a first end and a second end arranged in a first direction, the capacitor element including
a dielectric film,
a first electrode film disposed on the dielectric film, and
a second electrode film facing the first electrode film across the dielectric film;

a first external electrode disposed on the first end of the capacitor element and connected to the first electrode film; and a second external electrode disposed on the second end of the capacitor element and connected to the second electrode film, wherein the first electrode film includes:
- a plurality of electrode segments separated by a plurality of first slits extending in the first direction and a plurality of second slits extending in a second direction perpendicular to the first direction, the plurality of electrode segments being arranged in a matrix form including a plurality of rows arranged in the first direction and a plurality of columns arranged in the second direction;
- a plurality of first fuses located at the plurality of second slits so as to connect electrode segments out of the plurality of electrode segments adjacent to each other in the first direction; and
- a plurality of second fuses located at the plurality of first slits so as to connect electrode segments out of the plurality of electrode segments adjacent to each other in the second direction, wherein at least one of the plurality of second fuses is located at each of the plurality of first slits, wherein the plurality of columns of the electrode segments consist of a farthest column farthest from the first external electrode among the plurality of columns of the electrode segments and one or more other columns other than the farthest column, wherein, in each of the one or more other columns, at least one electrode segment of two electrode segments out of the plurality of electrode segments adjacent to a certain one of the electrode segments in the second direction is electrically disconnected from the certain one of the electrode segments in the second direction, and wherein, in each of the one or more other columns, two electrode segments out of the plurality of electrode segments adjacent to each other in the second direction are electrically connected to each other via one of the plurality of second fuses.

2. The film capacitor according to claim 1, wherein, in at least one of the plurality of columns, a certain second fuse out of the plurality of second fuses deviates in the first direction from a second fuse out of the plurality of second fuses adjacent to the certain second fuse.

3. The film capacitor according to claim 1,
wherein the plurality of columns includes a first column and a second column farther from the first external electrode than the first column, and
wherein a number of one or more second fuses out of the second fuses located in the second column is larger than a number of one or more second fuses out of the plurality of second fuses located in the first column.

4. The film capacitor according to claim 1, wherein, in each of the one or more other columns, the plurality of second fuses are arranged in the second direction while skipping the electrode segments at predetermined intervals.

5. The film capacitor according to claim 4,
wherein the one or more other columns comprises a plurality of other columns,
wherein, in each of the plurality of other columns, the plurality of second fuses are arranged in the second direction while skipping the second electrode segments at predetermined intervals, and wherein a number of one or more second fuses out of the plurality of second fuses disposed in each of the plurality of other columns is identical to each other.

6. The film capacitor according to claim 4,
wherein the one or more other columns comprises a plurality of other columns, and
wherein, in two columns out of the plurality of other columns adjacent to each other, the plurality of second fuses are arranged alternately in the second direction.

7. The film capacitor according to claim 1, wherein widths of the plurality of second fuses in the first direction is smaller than widths of the plurality of first fuses in the second direction.

8. The film capacitor according to claim 1, wherein the plurality of first fuses connects all electrode segments out of the plurality of electrode segments disposed in each of the plurality of rows to each other.

9. A film capacitor comprising:
a capacitor element having a first end and a second end arranged in a first direction, the capacitor element including
a dielectric film,
a first electrode film disposed on the dielectric film, and
a second electrode film facing the first electrode film across the dielectric film;
a first external electrode disposed on the first end of the capacitor element and connected to the first electrode film; and
a second external electrode disposed on the second end of the capacitor element and connected to the second electrode film,
wherein the first electrode film includes:
- a plurality of electrode segments separated by a plurality of first slits extending in the first direction and a plurality of second slits extending in a second direction perpendicular to the first direction, the plurality of electrode segments being arranged in a matrix form including a plurality of rows arranged in the first direction and a plurality of columns arranged in the second direction;
- a plurality of first fuses located at the plurality of second slits so as to connect electrode segments out of the plurality of electrode segments adjacent to each other in the first direction; and
- a plurality of second fuses located at the plurality of first slits so as to connect electrode segments out of the plurality of electrode segments adjacent to each other in the second direction, wherein at least one of the plurality of second fuses is located at each of the plurality of first slits, wherein the plurality of columns of the electrode segments include a farthest column farthest from the first external electrode among the plurality of columns of the electrode segments and one or more other columns other than the farthest column, wherein, in each of the one or more other columns, at least one electrode segment of two electrode segments out of the plurality of electrode segments adjacent to any one of the electrode segments in the second direction is electrically disconnected from the any one of the electrode segments in the second direction, and wherein, in each of the one or more other columns, the plurality of second fuses are arranged in the second direction while skipping the electrode segments at predetermined intervals.

10. The film capacitor according to claim 9, wherein, in at least one of the plurality of columns, a certain second fuse out of the plurality of second fuses deviates in the first direction from a second fuse out of the plurality of second fuses adjacent to the certain second fuse.

11. The film capacitor according to claim 9,
wherein the plurality of columns includes a first column and a second column farther from the first external electrode than the first column, and
wherein a number of one or more second fuses out of the second fuses located in the second column is larger than a number of one or more second fuses out of the plurality of second fuses located in the first column.

12. The film capacitor according to claim 9,
wherein the one or more other columns comprises a plurality of other columns,
wherein, in each of the plurality of other columns, the plurality of second fuses are arranged in the second direction while skipping the second electrode segments at predetermined intervals, and
wherein a number of one or more second fuses out of the plurality of second fuses disposed in each of the plurality of other columns is identical to each other.

13. The film capacitor according to claim 9,
wherein the one or more other columns comprises a plurality of other columns, and
wherein, in two columns out of the plurality of other columns adjacent to each other, the plurality of second fuses are arranged alternately in the second direction.

14. The film capacitor according to claim 9, wherein widths of the plurality of second fuses in the first direction is smaller than widths of the plurality of first fuses in the second direction.

15. The film capacitor according to claim 9, wherein the plurality of first fuses connects all electrode segments out of the plurality of electrode segments disposed in each of the plurality of rows to each other.

16. A film capacitor comprising:
a capacitor element having a first end and a second end arranged in a first direction, the capacitor element including
a dielectric film,
a first electrode film disposed on the dielectric film, and
a second electrode film facing the first electrode film across the dielectric film;
a first external electrode disposed on the first end of the capacitor element and connected to the first electrode film; and
a second external electrode disposed on the second end of the capacitor element and connected to the second electrode film,
wherein the first electrode film includes:
a plurality of electrode segments separated by a plurality of first slits extending in the first direction and a plurality of second slits extending in a second direction perpendicular to the first direction, the plurality of electrode segments being arranged in a matrix form including a plurality of rows arranged in the first direction and a plurality of columns arranged in the second direction;
a plurality of first fuses located at the plurality of second slits so as to connect electrode segments out of the plurality of electrode segments adjacent to each other in the first direction; and
a plurality of second fuses located at the plurality of first slits so as to connect electrode segments out of the plurality of electrode segments adjacent to each other in the second direction,
wherein at least one of the plurality of second fuses is located at each of the plurality of first slits,
wherein the plurality of columns of the electrode segments consist of a farthest column farthest from the first external electrode among the plurality of columns of the electrode segments and one or more other columns other than the farthest column,
wherein, in each of the one or more other columns, at least one electrode segment of two electrode segments out of the plurality of electrode segments adjacent to any one of the electrode segments in the second direction is electrically disconnected from the any one of the electrode segments in the second direction, and
wherein, in each of the one or more other columns, the plurality of second fuses are arranged in the second direction while skipping the electrode segments at predetermined intervals.

17. The film capacitor according to claim 16,
wherein the one or more other columns comprises a plurality of other columns,
wherein, in each of the plurality of other columns, the plurality of second fuses are arranged in the second direction while skipping the second electrode segments at predetermined intervals, and
wherein a number of one or more second fuses out of the plurality of second fuses disposed in each of the plurality of other columns is identical to each other.

18. The film capacitor according to claim 16,
wherein the one or more other columns comprises a plurality of other columns, and
wherein, in two columns out of the plurality of other columns adjacent to each other, the plurality of second fuses are arranged alternately in the second direction.

* * * * *